(12) United States Patent
Ridray

(10) Patent No.: US 12,420,937 B2
(45) Date of Patent: Sep. 23, 2025

(54) PROPULSION ASSEMBLY FOR AN AIRCRAFT, COMPRISING A LOAD BEARER

(71) Applicant: AIRBUS OPERATIONS (S.A.S.), Toulouse (FR)

(72) Inventor: Frédéric Ridray, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 412 days.

(21) Appl. No.: 18/119,181

(22) Filed: Mar. 8, 2023

(65) Prior Publication Data

US 2023/0286663 A1    Sep. 14, 2023

(30) Foreign Application Priority Data

Mar. 8, 2022 (FR) ..................... 2202017

(51) Int. Cl.
    *B64D 29/06* (2006.01)
    *B64D 27/40* (2024.01)
(52) U.S. Cl.
    CPC ........... *B64D 29/06* (2013.01); *B64D 27/402* (2024.01); *B64D 27/404* (2024.01)
(58) Field of Classification Search
    CPC .... B64D 29/06; B64D 27/402; B64D 27/404; B64D 27/18; B64D 2/12; B64D 27/16; B64D 27/40; B64D 29/00; B64D 29/02; B64C 3/32; B64C 7/02; B64C 7/20
    See application file for complete search history.

(56) References Cited

U.S. PATENT DOCUMENTS

| | | | |
|---|---|---|---|
| 9,919,804 B2* | 3/2018 | Pautis | B64D 27/406 |
| 11,697,506 B2* | 7/2023 | Schelfaut | B64D 27/406 |
| | | | 244/54 |
| 2015/0122943 A1* | 5/2015 | Wu | B64D 27/402 |
| | | | 244/54 |
| 2015/0175268 A1* | 6/2015 | Guillou | B64D 27/404 |
| | | | 244/54 |
| 2018/0118358 A1* | 5/2018 | Hellegouarch | F01D 25/28 |
| 2020/0189759 A1* | 6/2020 | Auge | B64D 27/404 |

FOREIGN PATENT DOCUMENTS

| | | |
|---|---|---|
| EP | 3 666 659 | 6/2020 |
| FR | 2 978 730 | 2/2013 |
| FR | 3 088 906 | 5/2020 |
| FR | 3 089 954 | 6/2020 |

OTHER PUBLICATIONS

French Search Report for Application No. FR 2202017, two pages, dated Sep. 22, 2022.

* cited by examiner

Primary Examiner — Assres H Woldemaryam
(74) Attorney, Agent, or Firm — Nixon & Vanderhye P.C.

(57) ABSTRACT

A propulsion assembly is disclosed including a pylon, a turbomachine including an engine and a fan surrounded by a fan casing, a nacelle surrounding the engine and the fan casing, and including a load bearer positioned at the upper part of the nacelle and split into two bearers, a forward fan mount between a frontal zone of the fan casing and a frontal zone of the upstream bearer, a rear pylon mount between the pylon and the downstream bearer, and a positioning assembly providing positioning between the fan casing and each bearer. The propulsion assembly is configured to improve the control over the separation between the articulated lateral cowls and the nose cowl.

15 Claims, 5 Drawing Sheets

PROPULSION ASSEMBLY FOR AN AIRCRAFT, COMPRISING A LOAD BEARER

CROSS REFERENCE TO RELATED APPLICATION

This application claims priority to and incorporates by reference French Application Number FR 2202017, filed Mar. 8, 2022.

BACKGROUND

1. Field of the Invention

The present disclosure relates to a propulsion assembly, and more specifically, to an aircraft engine support assembly having a pylon, a load bearer, a turbomachine having a fan casing, a forward fan mount for attaching the fan casing to the load bearer, a rear pylon mount for attaching the pylon to the load bearer, and a positioning assembly providing positioning between the fan casing and the load bearer. The present disclosure also relates to an aircraft having at least one such propulsion assembly.

2. Description of Related Art

As an example, EP-A-3 666 659 discloses a propulsion assembly which comprises a load bearer which supports a pylon and a fan casing of an aircraft turbomachine. The aircraft in the conventional way includes a wing beneath which is fixed the pylon to which is fixed the turbomachine which comprises an engine and the fan casing which are fixed to the pylon via a forward engine mount and a rear engine mount.

Arranged at the front of the turbomachine is a nose cowl which delimits an air intake. On the load bearer, fan cowls and thrust reversal cowls are mounted in an articulated manner on hinges.

Although such an installation is fully satisfactory, it is desirable to improve, amongst other things, the ease of assembly and the separation between the articulated lateral cowls and the nose cowl.

SUMMARY

The present disclosure contemplates an alternative propulsion assembly which makes it possible to save space.

The present disclosure is embodied as a propulsion assembly for an aircraft including
  a pylon intended to be fastened beneath a wing of the aircraft,
  a turbomachine comprising an engine and a fan surrounded by a fan casing and positioned upstream of the engine, said turbomachine having a longitudinal direction X, a transverse direction Y, a vertical direction Z and a midplane XZ,
  a nacelle surrounding the engine and the fan casing and comprising a load bearer positioned at the upper part of the nacelle and comprising an upstream bearer and a downstream bearer, a nose cowl fixed to a frontal zone of the fan casing forward of the load bearer and upstream cowls mounted in an articulated manner on each side of the upstream bearer and downstream cowls mounted in an articulated manner on each side of the downstream bearer,
  a forward fan mount fixed between the frontal zone of the fan casing and a frontal zone of the upstream bearer,
  a rear pylon mount fixed between the pylon and a rear part of the downstream bearer, and
  for each bearer, a positioning assembly comprising a peg secured to a lower spar of said bearer and extending vertically downwards, a shoe secured to the upper part of the fan casing and having a drilling in which said peg becomes lodged, the drilling being arranged to allow the peg to move only parallel to the longitudinal direction X and the vertical direction Z, and a locking system which locks the peg in the drilling, the locking system being arranged to allow the peg to move parallel to the longitudinal direction X and limit the movements of the peg parallel to the vertical direction Z.

The propulsion assembly improves the control over the separation between the articulated lateral cowls and the nose cowl.

According to an exemplary embodiment, each drilling has, in the XY plane, a cross section of oblong shape of which the major axis is parallel to the longitudinal direction X.

According to an exemplary embodiment, each locking system consists of an orifice passing horizontally through the peg, a window passing through the shoe and aligned with the orifice when the bearer is in place, and a pin which fits in through the orifice and the window.

According to an exemplary embodiment, the forward fan mount constitutes a hinge about which the upstream bearer is mounted with the ability to rotate about an upstream axis perpendicular to the vertical midplane XZ.

According to an exemplary embodiment, the rear pylon mount constitutes a hinge about which the downstream bearer is mounted with the ability to rotate about a downstream axis perpendicular to the vertical midplane XZ.

According to an exemplary embodiment, the upstream cowl is fixed to the upstream bearer by three first hinges, the two rearmost hinges being fixed hinges and the forwardmost hinge being a floating hinge.

According to an exemplary embodiment, the downstream cowl is fixed to the downstream bearer by four second hinges, the two forwardmost hinges being fixed hinges, the rearmost hinge being a floating hinge, and the intermediate hinge being a semi-floating or floating hinge.

According to an exemplary embodiment, the propulsion assembly comprises a seal secured to a rear face of the upstream bearer and which has a free edge projecting towards a front face of the downstream bearer, a deflector fixed to the front face of the downstream bearer, and the deflector has a sloping wall, an upstream wall and a downstream wall which are perpendicular to the longitudinal direction X, the downstream wall being set back in relation to the upstream wall and the sloping wall forming the connection between the downstream wall and the upstream wall.

The invention also contemplates an aircraft having at least one propulsion assembly according to one of the preceding features.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Throughout the following description, by convention, the direction X corresponds to the longitudinal direction of the turbomachine, this direction being parallel to the longitudinal axis X of this turbomachine and oriented towards the front of the aircraft, which is to say in the direction of forward travel F of the aircraft when the turbomachine is in operation. Moreover, the direction Y corresponds to the direction oriented transversely relative to the turbomachine, and the direction Z corresponds to the vertical direction or height, these three directions being mutually orthogonal. The turbomachine has a vertical midplane XZ.

Figure 1:
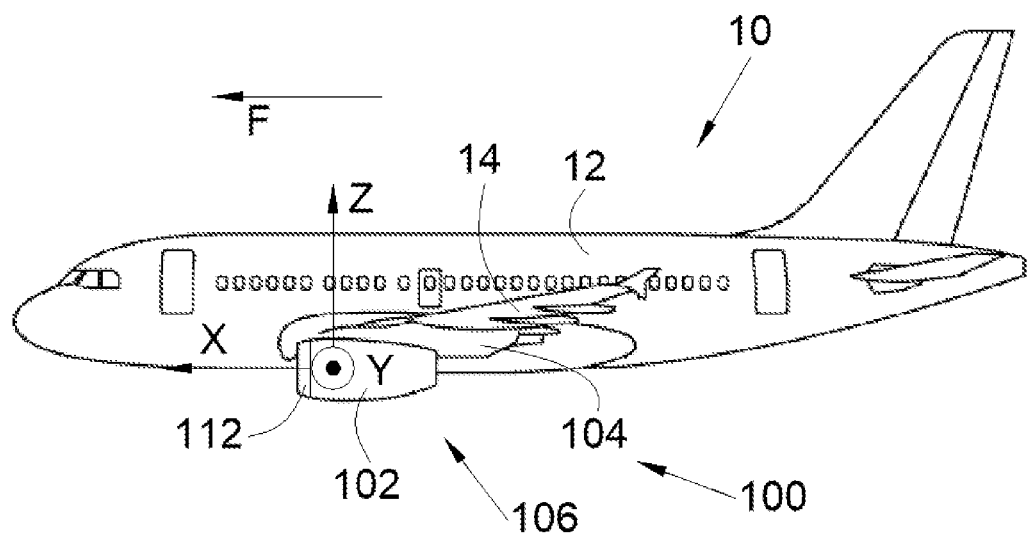
FIG. 1 is a side view of an aircraft having a propulsion assembly according to an exemplary embodiment.

FIG. 1 shows an aircraft 10 which comprises a fuselage 12 to which are attached two wings 14, one on either side of the fuselage 12. Beneath each wing 14 is fastened at least one propulsion assembly 100 which has a pylon 104 fastened beneath the wing 14 and a turbomachine 102, in this case a bypass turbomachine, fixed to the pylon 104 and comprising an engine 202 (FIG. 3) and a fan surrounded by a fan casing 204 (FIG. 3) and disposed upstream of the engine 202 and driven by the engine 202. The propulsion assembly 100 also comprises a cylindrical nacelle 106 which surrounds the engine 202 and the fan casing 204.

Figure 2:
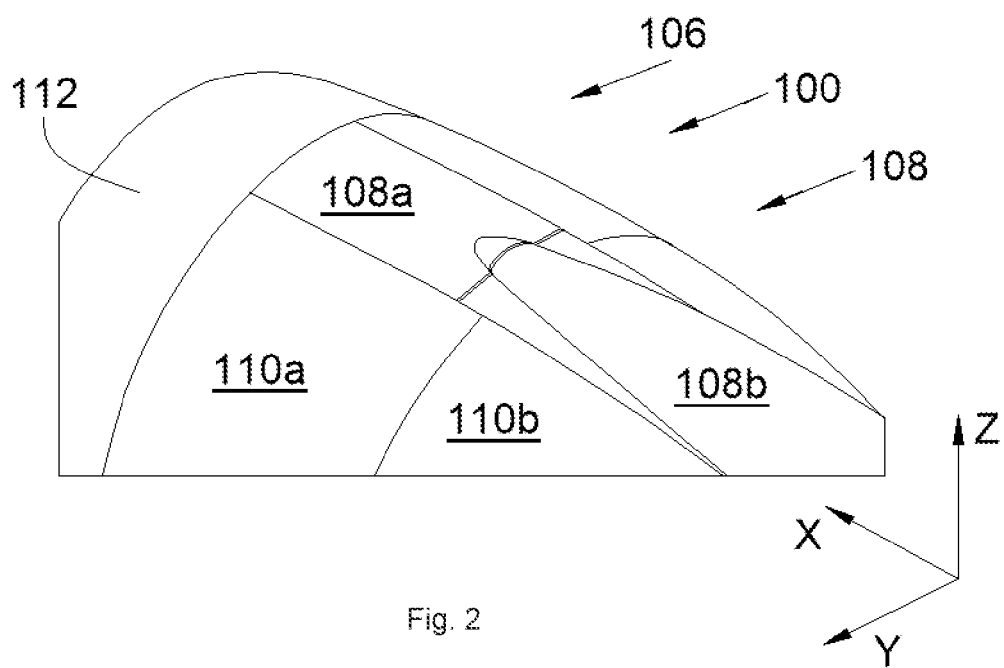
FIG. 2 is a plan view of the propulsion assembly according to an exemplary embodiment.

FIG. 2 shows the propulsion assembly 100. The nacelle 106 comprises a load bearer 108 which is positioned at the upper part of the nacelle 106 and which comprises an upstream bearer 108a and a downstream bearer 108b which is positioned rearward of the upstream bearer 108a, the upstream bearer 108a and the downstream bearer 108b being two distinct entities. The nacelle 106 also comprises lateral cowls 110a, 110b, and there are upstream cowls 110a, typically fan cowls, and downstream cowls 110b, typically thrust reversal cowls 110b for reversing the thrust.

The upstream cowls 110a are mounted in an articulated manner on each side of the midplane XZ of the load bearer 108 about a first hinge axis 206a (FIG. 3) and the downstream cowls 110b are likewise mounted in an articulated manner on either side of the midplane XZ of the load bearer 108, about a second hinge axis 206b. The two hinge axes 206a-b may be coaxial.

The upstream cowls 110a are mounted in an articulated manner on the upstream bearer 108a, and the downstream cowls 110b are mounted in an articulated manner on the downstream bearer 108b.

FIG. 2 shows the propulsion assembly 100 without the lateral cowls 110a, 110b. Each lateral cowl 110a, 110b is mounted in an articulated manner on a plurality of hinges. Each hinge has a first hinge fitting and a second hinge fitting mounted in an articulated manner on the first hinge fitting about the hinge axis 206a, 206b. The second hinge fittings are fixed to the lateral cowls 110a, 110b.

In an exemplary embodiment, the three first hinges, which are embodied here in the form of their first hinge fittings 208e to 208g and which are the ones that are furthest forward, are the ones used for fixing the upstream cowls 110a to the upstream bearer 108a. The four second hinges, which are embodied here in the form of their first hinge fittings 208a-d and which are the ones that are furthest towards the rear, are the ones used for fixing the downstream cowls 110b to the downstream bearer 108b.

Figure 3:
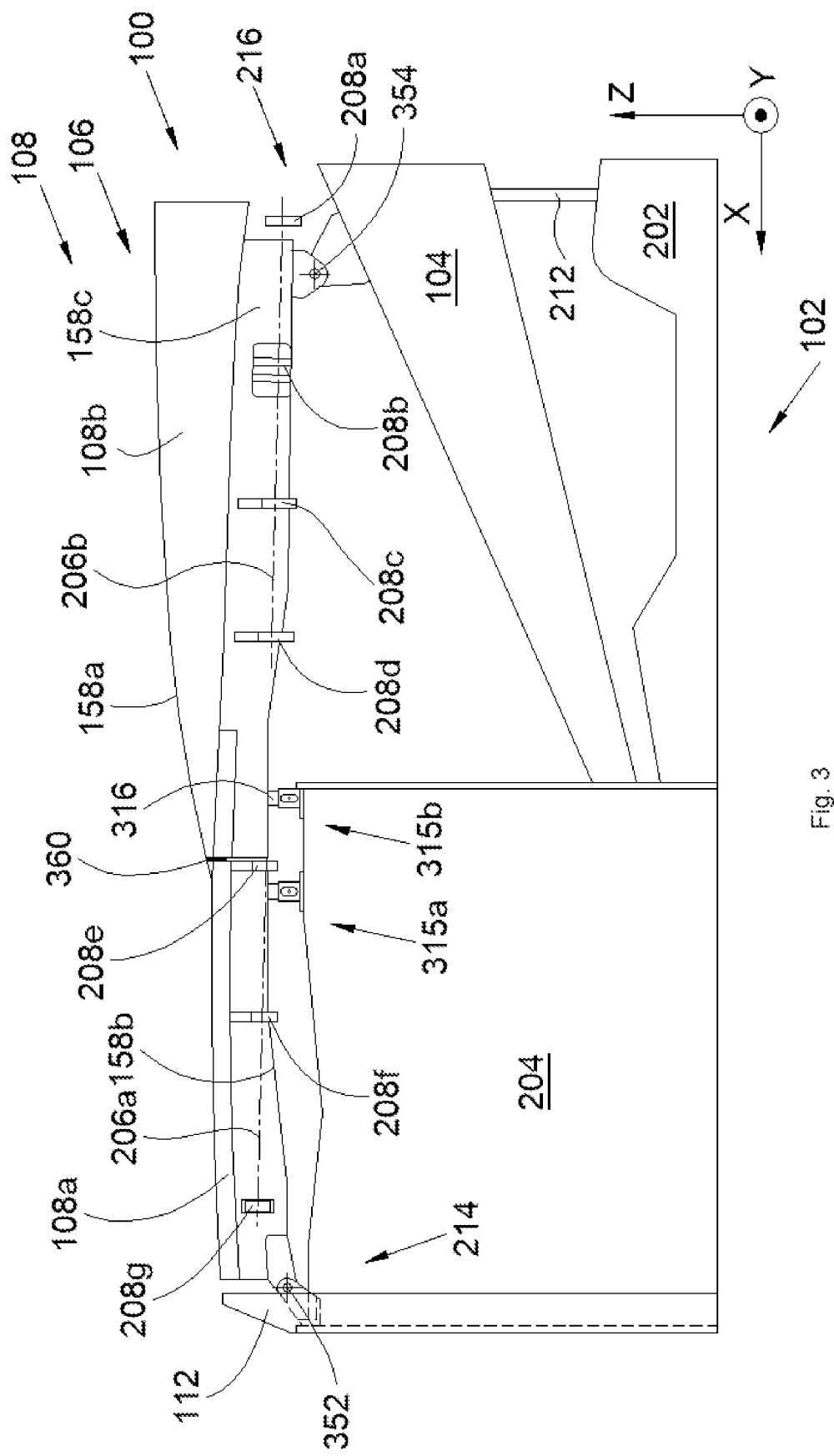
FIG. 3 is a side view of the propulsion assembly according to an exemplary embodiment.

Referring now to FIG. 3, of the three first hinges, the rearmost two hinges are fixed hinges and the forwardmost hinge is a floated hinge, and of the four second hinges, the two forwardmost hinges are fixed hinges, the rearmost hinge is a floating hinge, and the intermediate hinge is either floating or semi-floating.

For each fixed hinge, the second hinge fitting is fixed to the corresponding lateral cowl 110a, 110b, and the first hinge fitting 208a, 208b, 208e, 208f is fixed to the corresponding load bearer 108a, 108b. In the case of the semi-floating hinge, the second hinge fitting is fixed to the downstream cowl 110b and the first hinge fitting 208c is fixed in an articulated manner to the downstream load bearer 108b about an axis of rotation that is parallel to the second hinge axis 206b.

For each floating hinge, the second hinge fitting is fixed to the corresponding lateral cowl 110a, 110b and the first hinge fitting 208d, 208g constitutes the first hinge fitting for the lateral cowl 110a, 110b positioned symmetrically on the other side of the vertical midplane XZ. The first hinge fitting 208d, 208g thus passes through the upper part of the nacelle 106 without being fixed other than by the second hinge fittings of the two lateral cowls 110a, 110b.

Each bearer 108a, 108b takes the form of a box section formed of an upper spar 158a, of a lower spar 158b and of lateral spars 158c, 158d. To complete the structure, each load bearer 108a, 108b has a plurality of ribs distributed along inside the box section and fixed to the spars 158a, 158d.

The nacelle 106 also here comprises a nose cowl 112 which is fixed to a frontal zone of the fan casing 204 forward of the load bearer 108, which is to say forward of the upstream bearer 108a and extending as far as an air intake via which the air supplying the turbomachine 102 enters.

The pylon 104 is fixed to the structure of the wing 14 and bears the engine 202 to which it is fastened by a rear engine mount 212 fixed between a rear part of the pylon 104 and a rear part of the engine 202 and a forward engine mount fixed between a front part of the pylon 104 and a front part of the engine 202, in particular at the hub of said engine 202. In the embodiment of the invention presented in FIG. 3, the forward engine mount is hidden by the fan casing 204.

The forward engine mount and the rear engine mount 212 will not be described in more detail since they can take any of the forms known to a person skilled in the art. The propulsion assembly 100 also comprises a forward fan mount 214 fixed between the frontal zone of the fan casing 204 and a frontal zone of the upstream bearer 108a. The upstream bearer 108a thus extends over the fan casing 204 and its frontal zone is therefore the furthest-forward zone. The frontal zone of the fan casing 204 is its furthest-forward zone.

The forward fan mount 214 is located in the upper part of the fan casing 204. The forward fan mount 214 constitutes a hinge about which the upstream bearer 108a is mounted with the ability to rotate about an upstream axis 352 perpendicular to the vertical midplane XZ.

Figure 5:
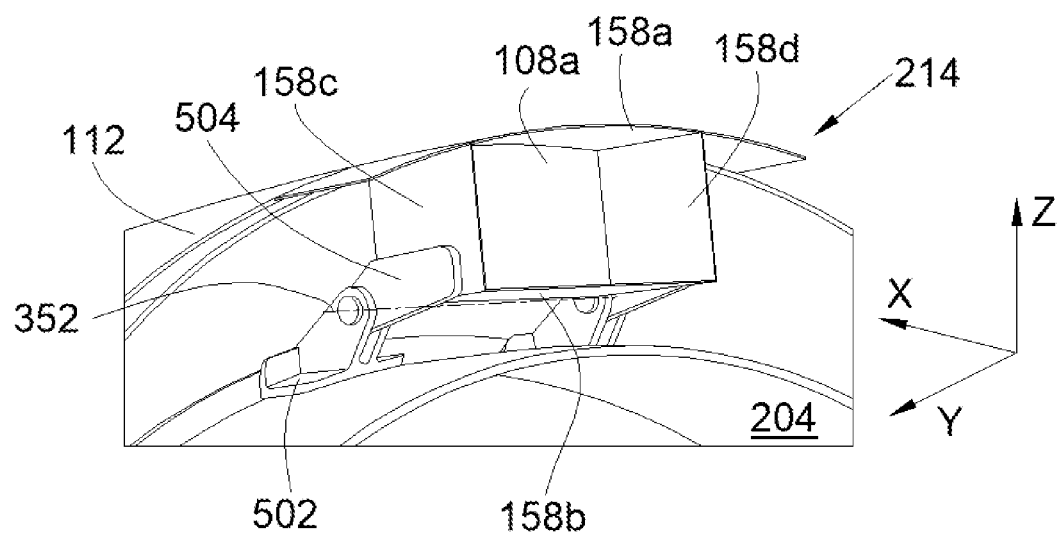
FIG. 5 is a detailed perspective view of a forward fan mount of the propulsion assembly according to an exemplary embodiment.

Referring now to FIG. 5, the forward fan mount 214 comprises, on each side of the midplane XZ, a first fitting 502 secured to the fan casing 204 and more particularly here to the rear of a flange defining the frontal zone of the fan casing 204, and a second fitting 504 secured to the upstream bearer 108a. The first fitting 502 and the second fitting 504 are mounted articulated to one another about the upstream axis 352.

The propulsion assembly 100 also comprises a rear pylon mount 216 fixed between the pylon 104 and a rear part of the downstream bearer 108b. The rear pylon mount 216 constitutes a hinge about which the downstream bearer 108b is mounted with the ability to rotate about a downstream axis 354 perpendicular to the vertical midplane XZ.

Figure 7:
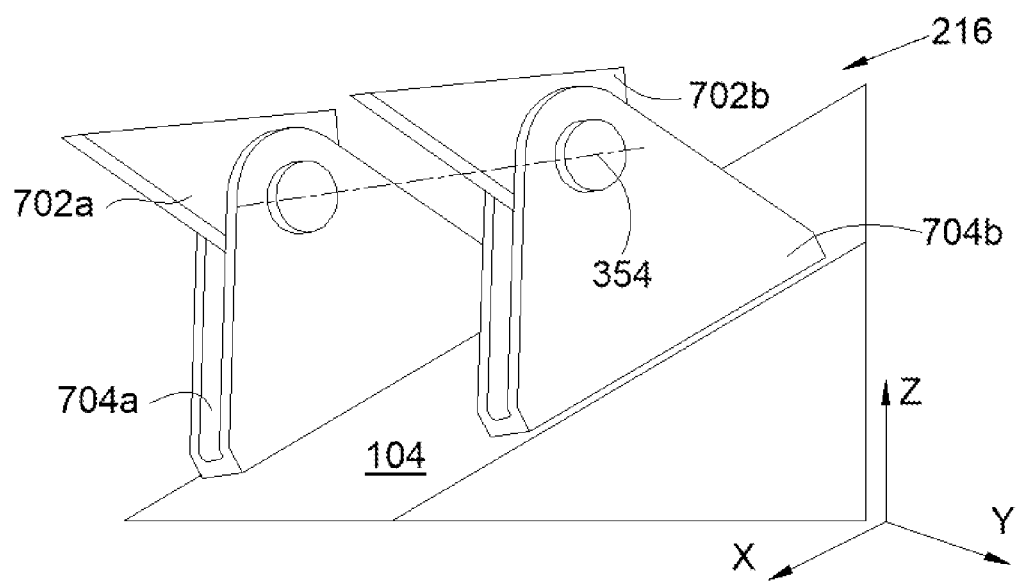
FIG. 7 is a perspective view of a rear pylon mount of the propulsion assembly according to an exemplary embodiment; and, FIG. 8 is a side sectional view on a vertical midplane of a seal system of the propulsion assembly according to an exemplary embodiment.

Referring now to FIG. 7, the rear pylon mount 216 comprises, on each side of the midplane XZ, a female yoke fitting 704a, 704b fixed to the pylon 104 and a male yoke fitting 702a, 702b fixed underneath the lower spar 158b of the downstream bearer 108b and mounted so that it is articulated in the female yoke fitting 704a, 704b about the downstream axis 354. The rear pylon mount 216 is configured to react forces in Y and in Z.

Dividing the load bearer 108 into two distinct assemblies also makes the propulsion assembly 100 easier to assemble and allows the lateral cowl support functions to be separated, thus guaranteeing the separations between the nose cowl 112 and, on the one hand, the upstream cowls 110a and, on the other hand, the load bearer 108, by virtue of the fact that the upstream bearer 108a and the fan casing 204 are fixed at their frontal parts, and so likewise improving the positioning of the downstream cowls 110b with respect to the pylon 104 by virtue of the fixing of the downstream bearer 108b and the pylon 104.

Figure 6:
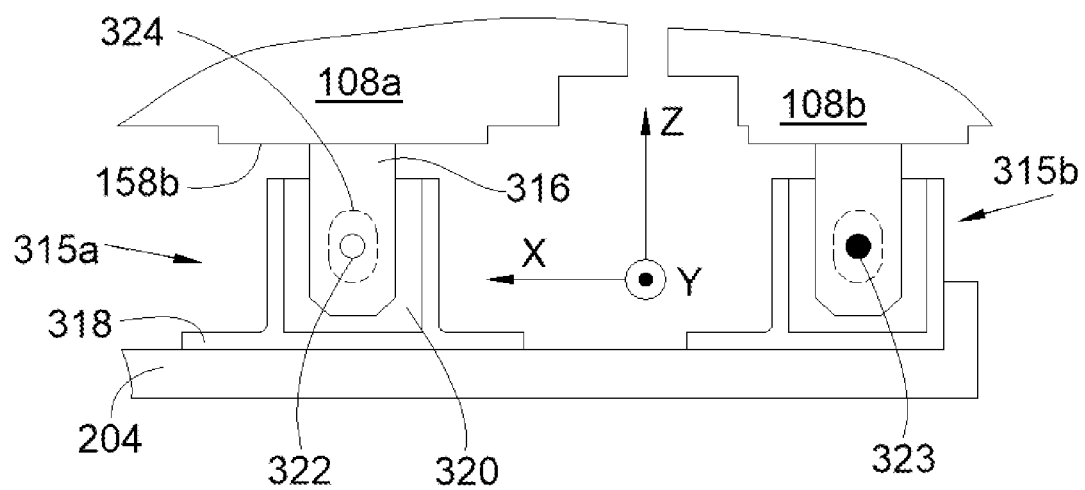
FIG. 6 is a side view in section on a vertical midplane of a positioning assembly of the propulsion assembly according to an exemplary embodiment.

The propulsion assembly 100 also comprises, for each bearer 108a, 108b, a positioning assembly 315a, 315b known as a spigot assembly, positioned at the midplane XZ of the turbomachine 102 and one embodiment of which is depicted in FIG. 6. Each positioning assembly 315a, 315b comprises a peg 316 secured to the lower spar 158b of the bearer 108a, 108b concerned and extending vertically downwards, a shoe 318 secured to the upper part of the fan casing 204 and having a drilling or an opening 320 which is open at the top and in which the associated peg 316 becomes lodged, the drilling 320 being arranged to allow the peg 316 to move only parallel to the longitudinal direction X and the vertical direction Z. Each positioning assembly 315a, 315b also comprises a locking system 322, 323, 324 which locks the peg 316 in the drilling 320, the locking system 322, 323, 324 being arranged to allow the peg 316 to move parallel to the longitudinal direction X and limit the movements of the peg 316 parallel to the vertical direction Z. Each shoe 318 is rather located at the rear of the fan casing 204.

Figure 4:
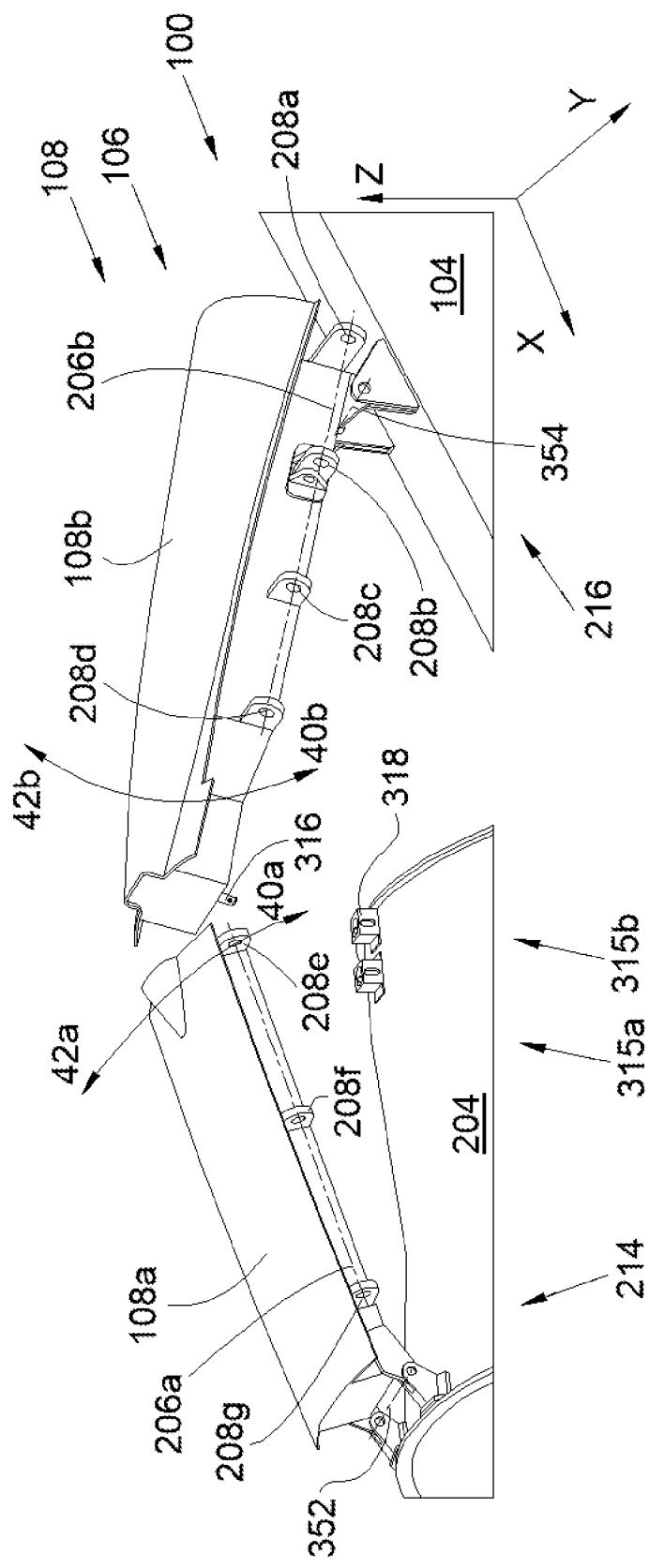
FIG. 4 is a perspective view of the propulsion assembly in an assembly phase according to an exemplary embodiment.

Referring now to FIG. 4, an assembly step in which the two bearers 108a, 108b are respectively brought closer to the forward fan mount 214 and the rear pylon mount 216 without the lateral cowls 110a, 110b so as to be fixed thereto is illustrated, and then each bearer 108a, 108b is pivoted (arrows 40a, 40b) respectively about the upstream axis 352 and about the downstream axis 354 so as to fit the pegs 316 into the drillings 320 in the shoes 318 where they can be locked using a locking system 322, 323, 324. The freedom that the pegs 316 have to move in X and Y means that the position of each bearer 108a, 108b can be adjusted. Such an arrangement also allows the upstream bearer 108a to be pre-fitted on the fan casing 204 and the downstream bearer 108b on the pylon 104 prior to final assembly of the propulsion assembly 100, thus making it possible to save time during said final assembly.

Each locking system 322, 323, 324 may furthermore be unlocked, thereby allowing each bearer 108a, 108b (42a, 42b) to be pivoted respectively about the forward fan mount 214 and the rear pylon mount 216 so as to be raised, thereby giving access to the components situated underneath, in the context of a maintenance operation. More specifically, each drilling 320 has, in the XY plane, dimensions that are such that the associated peg 316 is constrained parallel to the transverse direction Y and free to effect a translational movement parallel to the longitudinal direction X, which is to say that, in the XY plane, the peg 316 is able to move only parallel to the longitudinal direction X. The drilling 320 has, for example, in the XY plane, a cross section of oblong shape of which the major axis is parallel to the longitudinal direction X, and of which the width along the minor axis is equal to the diameter of the peg 316.

According to an exemplary embodiment, each peg 316 has an orifice 322 passing through it horizontally and, in this instance, parallel to the transverse direction Y. Each shoe 318 also has a window 324 (indicated in dotted line because this is a cross section) which passes through the shoe 318 and is aligned with the orifice 322 when the bearer 108a-b is in place. The orifice 322 is intended to accept a pin 323, or any other equivalent retention system, which passes through said orifice 322 and the window 324 in order to block the removal of the peg 316 from the shoe 318 through upward vertical movement parallel to the vertical direction Z. The dimensions of the window 324 are such that they do not prevent the peg 316, and therefore the pin 323 from moving parallel to the longitudinal direction X but do limit the vertical travel of the pin 323 and, therefore, of the peg 316 parallel to the vertical direction Z because of the fact that the pin 323 will impinge on the edges of the window 324.

Each locking system 322, 323, 324 is thus made up here of the orifice 322 in the peg 316, of the window 324 in the shoe 318, and of the pin 323. The limits on the movements of the peg 316 ensure that there is no contact between the pin 323 and the edges of the window 324 during the various phases of flight of the aircraft 10. The translational movement of the peg 316 is arrested when the pin 323 comes into contact with the edges of the window 324. This translational arresting is provided during maintenance phases and prevents the bearer 108a, 108b from lifting up when the cowls 110a, 110b are open and a gust of wind catches the cowls 110a, 110b and tends to lift the bearer 108a, 108b.

Such an arrangement also makes it possible to ensure that contact is indeed between the pin 323 and the edges of the window 324 rather than some other point not designed for this. The positioning assemblies 315a, 315b are positioned between the forward fan mount 214 and the rear pylon mount 216. Each positioning assembly 315a, 315b is able to react forces in Y, while allowing freedom to move in X and Z.

Figure 8:
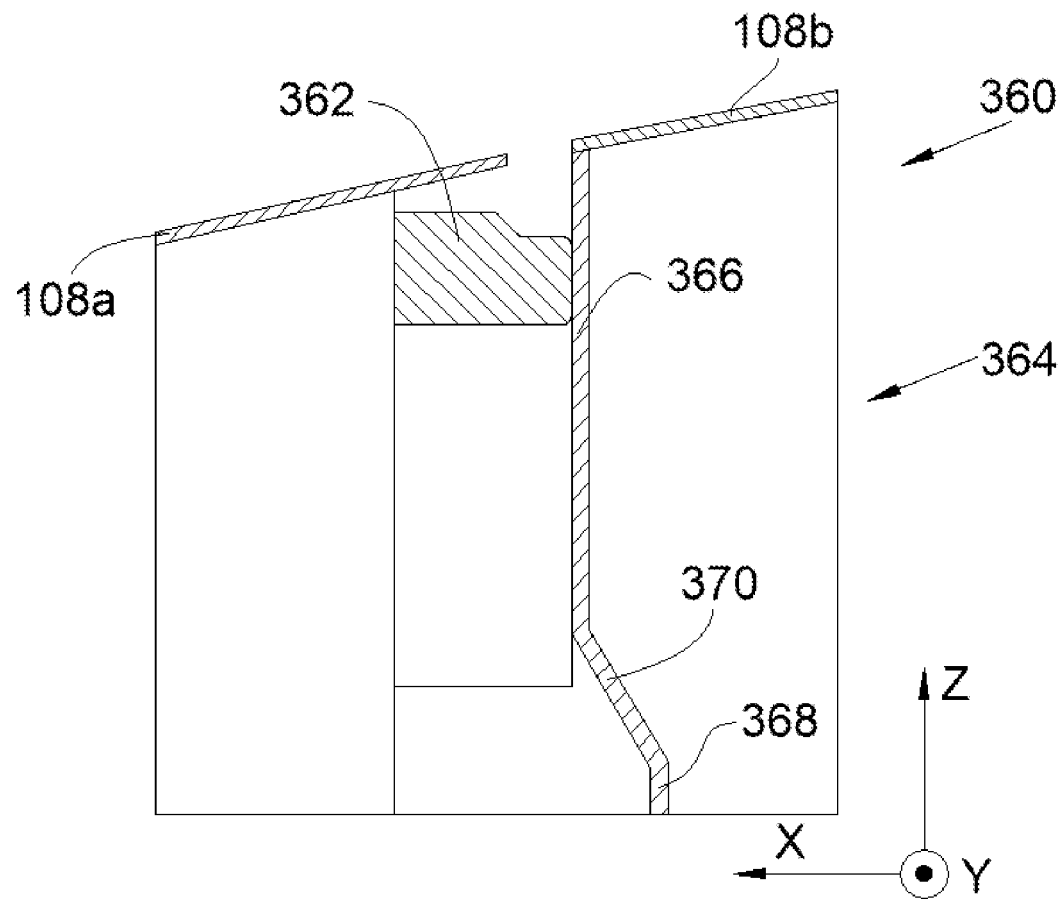

In order to provide sealing between the two bearers 108a, 108b, the propulsion assembly 100 comprises a seal system 360, an enlargement of which is given in FIG. 8. According to an exemplary embodiment, the seal system 360 comprises a seal 362 which is secured to a rear face of the upstream bearer 108a and which projects a free edge towards a front edge of the downstream bearer 108b.

The seal system 360 also comprises a deflector 364 fixed to the front face of the downstream bearer 108b. The deflector 364 comprises an upstream wall 366 and a downstream wall 368 which walls are perpendicular to the longitudinal direction X with the downstream wall 368 being set back in relation to the upstream wall 366. The deflector 364 also comprises a sloping wall 370 which makes the connection between the downstream wall 368 and the upstream wall 366. When the upstream bearer 108a is in place and the downstream bearer 108b is brought closer in order to fit same, the free edge of the seal 362 first of all faces the downstream wall 368, and then becomes progressively compressed by the sloping wall 370 until it finds itself facing the upstream wall 366 when the downstream bearer 108b is in place. The length of the seal 362 is such that, when the propulsion assembly 100 is in the assembled position, said seal 362 is compressed by the deflector 364. The rear face of the upstream bearer 108a and the front face of the downstream bearer 108b face one another when the bearers 108a, 108b are in place.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:
   a pylon configured to be fastened beneath a wing of the aircraft,
   a turbomachine comprising an engine a fan surrounded by a fan casing and positioned upstream of the engine, the turbomachine having a longitudinal direction X, a transverse direction Y, a vertical direction Z, and a midplane XZ,
   a nacelle surrounding the engine and the fan casing and further comprising a load bearer positioned at an upper part of the nacelle and comprising an upstream bearer and a downstream bearer, a nose cowl fixed to a frontal region of the fan casing forward of the load bearer and upstream cowls mounted in an articulated manner on each side of the upstream bearer and downstream cowls mounted in an articulated manner on each side of the downstream bearer,
   a forward fan mount fixed between the frontal zone of the fan casing and a frontal zone of the upstream bearer,
   a rear pylon mount fixed between the pylon and a rear part of the downstream bearer, and
   for each bearer, a positioning assembly comprising a peg secured to a lower spar of the bearer and extending vertically downwards, a shoe secured to the upper part of the fan casing and having an opening in which the peg becomes lodged, the opening being arranged to allow the peg to move only parallel to the longitudinal direction X and the vertical direction Z, and a locking system which locks the peg in the opening, the locking system being arranged to allow the peg to move parallel to the longitudinal direction X and limit the movements of the peg parallel to the vertical direction Z.

2. The propulsion assembly according to claim 1, wherein each opening has, in the XY plane, a cross section of oblong shape of which the major axis is parallel to the longitudinal direction X.

3. The propulsion assembly according to claim 1, wherein each locking system includes of an orifice passing horizontally through the peg, a window passing through the shoe and aligned with the orifice when the bearer is in place, and a pin which fits in through the orifice and the window.

4. The propulsion assembly according to claim 1, wherein the forward fan mount includes a hinge about which the upstream bearer is mounted with the ability to rotate about an upstream axis perpendicular to the vertical midplane XZ.

5. The propulsion assembly according to claim 1, wherein the rear pylon mount includes a hinge about which the downstream bearer is mounted with the ability to rotate about a downstream axis perpendicular to the vertical midplane XZ.

6. The propulsion assembly according to claim 1, wherein the upstream cowl is fixed to the upstream bearer by three first hinges, the two rearmost hinges being fixed hinges and the forwardmost hinge being a floating hinge.

7. The propulsion assembly according to claim 1, wherein the downstream cowl is fixed to the downstream bearer by four second hinges, the two forwardmost hinges being fixed hinges, the rearmost hinge being a floating hinge, and the intermediate hinge being a semi-floating or floating hinge.

8. The propulsion assembly according to claim 1, further comprising a seal secured to a rear face of the upstream bearer and which has a free edge projecting towards a front face of the downstream bearer, a deflector fixed to the front face of the downstream bearer, and in that the deflector has a sloping wall, an upstream wall and a downstream wall which are perpendicular to the longitudinal direction X, the downstream wall being set back in relation to the upstream wall and the sloping wall forming the connection between the downstream wall and the upstream wall.

9. An aircraft comprising at least one propulsion assembly according to claim 1.

10. A propulsion assembly of an aircraft having a wing, a pylon, a fan casing, and a nacelle, the propulsion assembly comprising:
   a load bearer disposed at an upper part of the nacelle and further comprising an upstream bearer and a downstream bearer,
   a nose cowl attached to a frontal region of the fan casing forward of the load bearer,
   upstream cowls pivotally mounted on each side of the upstream bearer,
   a pair of downstream cowls pivotally mounted on each side of the downstream bearer,
   a forward fan mount fixed between the frontal zone of the fan casing and a frontal zone of the upstream bearer,
   a rear pylon mount disposed between the pylon and a rear part of the downstream bearer,
   a positioning assembly for each bearer and comprising a peg secured to a lower spar of the bearer and extending vertically downwards,
   a shoe attached to the upper part of the fan casing and having an opening for bounding the peg and configured to allow the peg to move only parallel to a longitudinal direction and the vertical direction relative to the propulsion assembly, and a locking system configured to lock the peg in the opening.

11. The propulsion assembly according to claim 10, wherein the locking system further comprises an orifice extending horizontally through the peg, a window passing through the shoe and aligned with the orifice when the bearer is in place, and a pin fittingly disposed through the orifice and the window.

12. The propulsion assembly according to claim 10, wherein the forward fan mount further comprises a hinge for rotatably attaching the upstream bearer about an upstream axis perpendicular to a vertical midplane of the propulsion assembly.

13. The propulsion assembly according to claim 12, further comprising a first plurality of hinges for securing the upstream bearer to the upstream cowl, wherein at one of the first plurality of hinges is a floating hinge.

14. The propulsion assembly according to claim 12, further comprising a second plurality of hinges for securing the downstream bearer to the downstream cowl, wherein two of the second plurality of hinges are fixed hinges, one the second plurality of hinges is a floating hinge, and one the second plurality of hinges is a semi-floating hinge.

15. The propulsion assembly according to claim 10, further comprising:

a seal attached to the upstream bearer and having a free peripheral edge projecting towards a front face of the downstream bearer, a deflector attached to the front face of the downstream bearer, wherein the deflector comprises a sloping wall, an upstream wall, and a downstream wall all of which are perpendicular to the longitudinal direction, and wherein the sloping wall extends between the downstream wall and the upstream wall.

* * * * *